May 26, 1953 — B. A. WHITEMAN — 2,639,511
TAPER GAUGE
Filed June 13, 1949 — 2 Sheets-Sheet 1

INVENTOR.
BENTON A. WHITEMAN
BY
Ogle R. Singleton,
Atty.

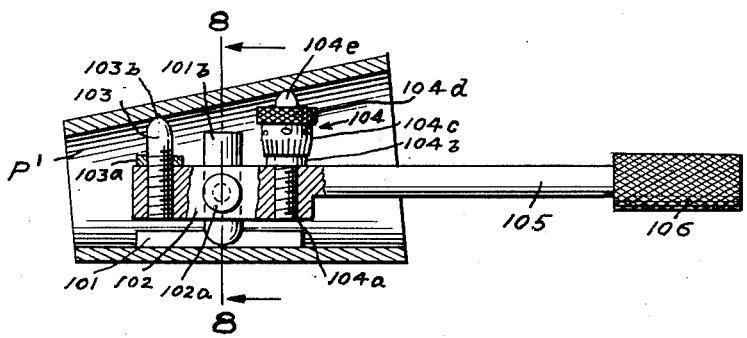
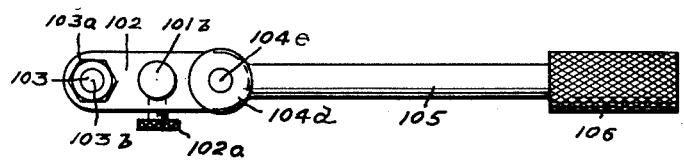
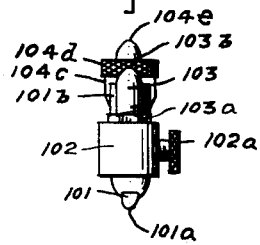 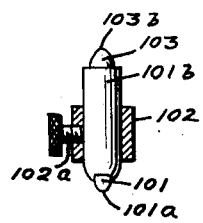

Patented May 26, 1953

2,639,511

UNITED STATES PATENT OFFICE 2,639,511

TAPER GAUGE

Benton A. Whiteman, Glen Allen, Va.

Application June 13, 1949, Serial No. 98,840

3 Claims. (Cl. 33—174)

My invention relates to a new and useful improvement in taper gauges and is designed to provide a precision tool for measuring tapers of work pieces. One familiar with the practice of machining tapered work pieces knows that very accurate measurement of the taper is necessary, that the piece be turned to the precise taper so that the piece may properly fit its socket. The lack of a tool for quickly and accurately making the necessary measurements prompted my invention. My improved tool meets this lack. The two forms of my tool measure exterior and interior tapers, respectively. The particularly novel and useful feature of both forms of my improved tool is the combination of three relatively adjustable parts whereby the amount of taper of the work piece can be measured. One of said parts provides a datum line and the other two are in constantly parallel planes normal to this line. By adjusting each of these parallel parts relative to the datum line, the taper of the work piece, over a determined linear distance, viz. that between the parallel parts, can be determined. My tool is compact, easily made and readily used.

While I have illustrated in the drawings and have hereinafter fully described two specific embodiments of my invention, it is to be distinctly understood that I do not consider my invention to be limited to said specific embodiments but reference is made to the claims appended hereto to define the scope of my invention.

In the drawings:

Fig. 5 is a side elevation, partly in vertical section, of the form of my tool for measuring interior tapers, applied to a work piece shown in vertical section.

Fig. 6 is a top plan of the tool shown in Fig. 5.

Fig. 7 is an end elevation of the tool.

Fig. 8 is a vertical section on the line 8—8 of Fig. 5, in the direction of the arrows.

Figure 1:
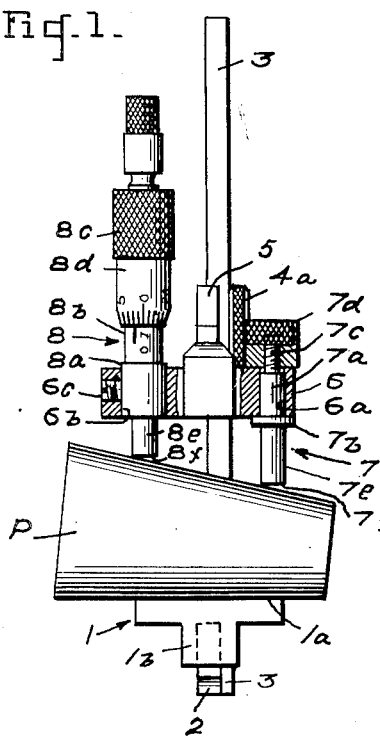
Fig. 1 is an end elevation, partly in vertical section, of the form of my tool for measuring exterior tapers, applied to a work piece shown in side elevation.
Figure 2:
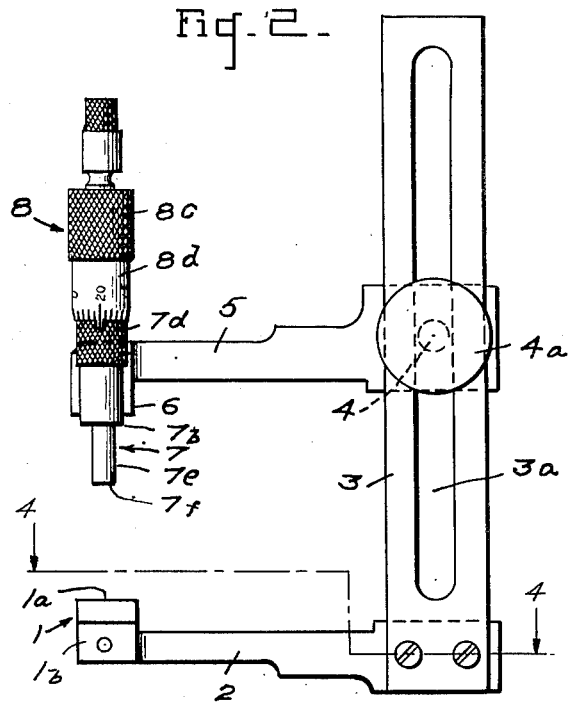
Fig. 2 is a side elevation of the tool shown in Fig. 1.
Figure 3:
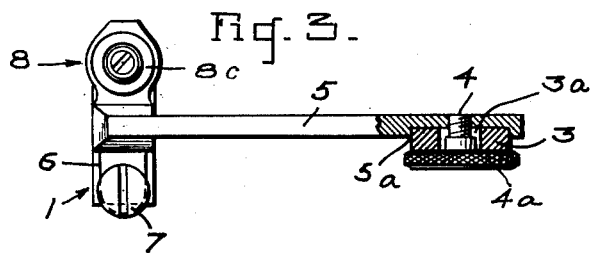
Fig. 3 is a top plan of the tool.
Figure 4:
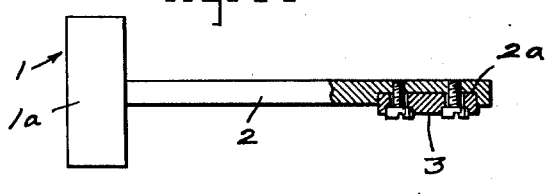
Fig. 4 is a horizontal section on the line 4—4 of Fig. 2, in the direction of the arrows.

As illustrated in Figs. 1 to 4, my improved tool for measuring exterior tapers, comprises an anvil 1 having a top plane face 1-a and a depending lug 1-b (Fig. 2) in which is pinned or otherwise suitably fixed the end of an arm 2 which has adjacent its other end a socket 2-a (Fig. 4) in which is fixedly seated a post 3 having a longitudinal slot 3-a (Fig. 2) in which is slidable a set screw 4 threaded into an arm 5 and having a knurled head 4-a bearing on the post 3 which is received in a slot 5-a (Fig. 3) in the arm 5. On the outer end of the arm 5, there is fixed a bracket 6.

It will be noted (Figs. 1 and 2) that the parts 1 to 6 are so related that while the arms 2 and 5 are relatively adjustable, by sliding arm 5 along post 3, the arms 2 and 5 both being normal to the post 3 are constantly parallel, and that the anvil 1 and bracket 6 are constantly aligned vertically.

A spindle 7 (Fig. 1) is mounted in the bracket 6, its middle portion 7-a fitting in a bore 6-a in the bracket 6, its collar 7-b engaging the lower face of the bracket 6 and its upper portion 7-c having threaded thereon a knurled lock-nut 7-d bearing on the upper face of the bracket 6. The lower portion 7-e of the spindle 7 depends from the bracket 6 toward the anvil 1, and its bottom plane face 7-f (Fig. 2) is constantly parallel with the top plane face 1-a of the anvil 1.

A micrometer 8 of common form is mounted in the bracket 6 (Fig. 1), its bushing 8-a fitting in a bore 6-b of the bracket 6 and being clamped therein by a lock bolt 6-c threaded in the bracket 6. A tube 8-b projecting from the bushing 8-a is provided with the usual micrometer scale and has threaded therein the micrometer measuring stem 8-c with an indicating sleeve 8-d co-acting with the scale. The lower portion 8-e of the measuring stem 8-c depends from the bracket 6 toward the anvil 1, and its bottom plane face 8-f Fig. 1) is constantly parallel with the faces 1-a of the anvil 1 and 7-f of the spindle 7.

It will be noted (Fig. 1) that the portions 7-c and 8-e of the spindle 7 and the micrometer 8, respectively, are of identical diameter, that the longitudinal axes of the spindle 7 and the micrometer 8 are normal to the parallel longitudinal axes of the anvil 1 and the bracket 6, and that (Fig. 3) the longitudinal axes of the spindle 7 and the micrometer 8 lie in a common vertical plane passing through the longitudinal axes of the anvil 1 and the bracket 6.

As illustrated in Figs. 5 to 8, my improved tool for measuring interior tapers comprises a base plate 101 having a bottom rectilinear edge 101-a and provided with a projecting post 101-b normal to the plate 101 and on which is slidably mounted a bar 102 having a set-screw 102-a for fixing the bar 102 in adjusted relation to the plate 101. A spindle 103 is threaded in the bar 102 and is provided with a lock-nut 103-a for fixing the spindle 103 in adjusted relation to the bar 102, and is so fabricated that its conical upper end terminates in an apex 103-b. A micrometer 104 is mounted in the bar 102, its shank 104-a being threaded therein and its collar 104-b engaging the upper face of the bar 102. The measuring stem 104-c of the micrometer 104 is threaded on the shank 104-a and has the usual micrometer scale, a knurled collar 104-d and its conical upper end terminates in an apex 104-e.

It will be noted (Fig. 5) that the longitudinal axes of the spindle 103 and the micrometer 104 are parallel and normal to the longitudinal axis of the plate 101, and, (Fig. 7) that the apices 103-b and 104-e lie in a common vertical plane passing through the edge 101-a of the plate 101.

The bar 102 has a rod 105 extending co-axially thereof with a knurled handle 106 on its outer end.

From the foregoing description of the details of construction of my improved tool, its operation for measuring tapers will be obvious. The form of the tool for measuring exterior tapers of work pieces (Figs. 1 to 4) operates as follows. When the plane face 1-a of the anvil 1 and the tapered face of the work piece P have been brought into contact (Fig. 1), the arm 5 is adjusted on the post 3 to bring the plane face 7-f of the spindle 7 into contact with the tapered face of the work piece P and the arm 5 is fixed on the post 3 by the set-screw 4. The micrometer 8 is then adjusted to bring its plane face 8-f into contact with the tapered face of the work piece P. The reading given by the micrometer 8 indicates the measure of the taper of the exterior face of the work piece P in the known distance, for instance one inch, between the axes of the spindle 7 and the measuring stem 8-c of the micrometer 8. The taper per inch is readily converted to degrees by reference to a taper and corresponding angle table, such tables being available in any machinist's hand book. The form of the tool for measuring interior tapers of work pieces (Figs. 5 to 8) operates as follows. The purpose of the threads on the spindle 103 is for properly relating the spindle 103 to the micrometer 104. The spindle 103 does not have to be adjusted in the bar 102 every time the tool is used. When the micrometer 104 is set at zero, the spindle 103 is so adjusted in the bar 102 that the distance from the apex 103-b to the edge 101-a and the distance from the apex 104-e to the edge 101-a are identical. The tool is thus properly adjusted for measuring tapers. The adjustment should last for a considerable period of use. When the inside taper is to be measured, the plate 101 and the bar 102 are so adjusted that the edge 101-a and the apex 103-b are in contact with the interior tapered face of the work piece P'. The micrometer 104 is then adjusted to bring the apex 104-e of its measuring stem 104-c into contact with the interior tapered face of the work piece P'. The reading given by the micrometer 104 indicates the measure of the taper of the interior face of the work piece P' in the known distance between the axes of the spindle 103 and the micrometer 104. This taper measurement can be converted, as above explained.

When I designed by improved tool for measuring interior tapers, I conceived the idea of making the tool with a plurality of interchangeable base plates 101. The tool, with about three or four interchangeable base plates, would take care of a wide range of measurements of work pieces. Such interchangeable plates would be identical except that the posts 101-b would be consecutively longer.

Having described my invention, what I claim is:

1. In a taper gauge, the combination of a base having a rectilinear edge; a post mounted on said base; a bar slidably mounted on said post for adjustment relative said base; a spindle threaded in said bar for adjustment relative said bar; and a micrometer mounted on said bar and having a measuring stem adjustable relative to said bar, the longitudinal axes of said spindle and said stem being parallel, normal to said edge, and relatively spaced a fixed distance, said spindle and said stem having outer ends, respectively, extending away from said edge.

2. In a tool for measuring internal tapers, the combination of a bar; a base adjustable on said bar and having a rectilinear edge; a spindle adjustable on said bar; and a micrometer having a stem adjustable on said bar, said base being disposed on one side of said bar and said spindle and said stem being disposed on the other side of said bar and having outer ends, respectively, extending away from said edge.

3. In a tool for measuring internal tapers, the combination of a base having a rectilinear edge; a post mounted in said base normal to said edge; a bar having a transverse bore in which said post is loosely received; a set-screw in said bar co-acting with said post for fixing said bar in adjusted relation with said base; a spindle threaded in said bar for adjustment relative said bar; and a micrometer having a shank threaded in said bar and a measuring stem threaded on said shank, said spindle and said stem having conical outer ends, respectively, extending away from said edge and having their apices lying in a common plane passing through said edge.

BENTON A. WHITEMAN.

References Cited in the file of this patent

UNITED STATES PATENTS

| Number | Name | Date |
|---|---|---|
| 456,875 | Bellows | July 28, 1891 |
| 1,389,381 | Renton | Aug. 30, 1921 |
| 1,398,296 | Goguen et al. | Nov. 29, 1921 |
| 2,016,420 | Engst | Oct. 8, 1935 |
| 2,314,480 | Clark | Mar. 23, 1943 |

FOREIGN PATENTS

| Number | Country | Date |
|---|---|---|
| 359,535 | Germany | Sept. 23, 1922 |
| 360,544 | Germany | Sept. 28, 1922 |
| 608,171 | England | Sept. 10, 1948 |